Dec. 14, 1965    W. T. RENTSCHLER    3,223,012
CABLE RELEASE
Filed June 13, 1963    3 Sheets-Sheet 1

INVENTOR.
Waldemar T. Rentschler
BY
Arthur A. March
ATTORNEY

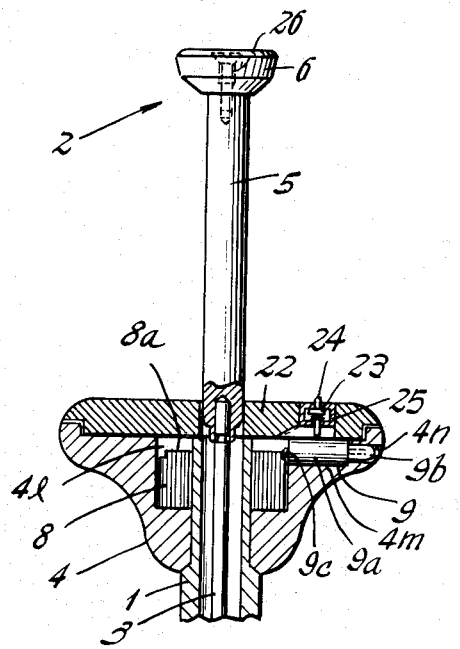
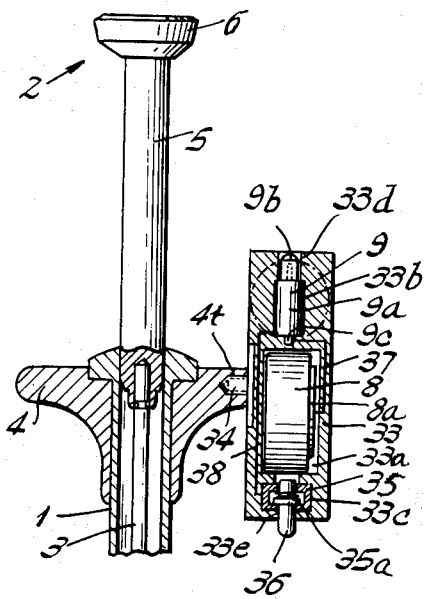
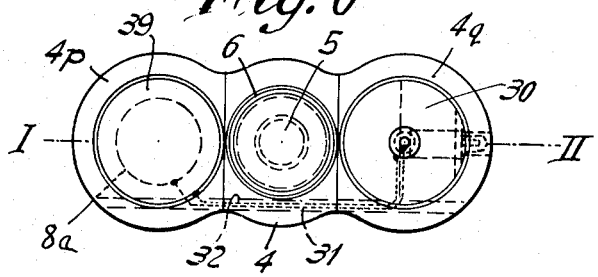
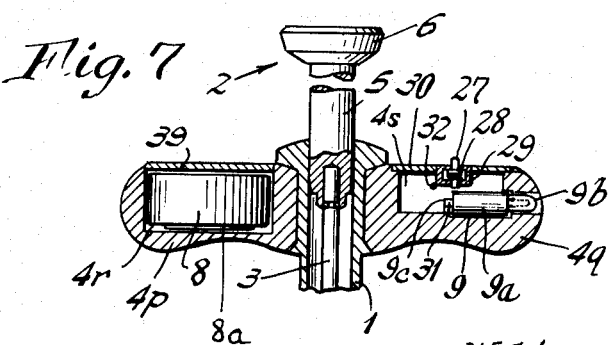

Dec. 14, 1965  W. T. RENTSCHLER  3,223,012
CABLE RELEASE

Filed June 13, 1963  3 Sheets-Sheet 3

INVENTOR.
Waldemar T. Rentschler
BY
Arthur A. March
ATTORNEY

United States Patent Office 3,223,012
Patented Dec. 14, 1965

3,223,012
CABLE RELEASE
Waldemar T. Rentschler, Calmbach (Enz), Germany, assignor to Alfred Gauthier, G.m.b.H., Calmbach (Enz), Germany, a corporation of Germany
Filed June 13, 1963, Ser. No. 287,664
Claims priority, application Germany, June 16, 1962, G 35,232
9 Claims. (Cl. 95—53)

This invention relates to cable releases for photographic cameras and the like.

Cable releases are commonly used to operate the shutters of photographic cameras when it is desired to avoid shaking the camera as might be done if the photographer operates the shutter release trigger mechanically mounted on the camera. Consequently cable releases are especially useful for time exposures when the light conditions are poor, although their use is by no means limited to those conditions. Such poor light conditions also make it difficult to set the camera controls properly, and while the controls may be provided with detents which cause clicks or thumps as the controls are moved, it is still not easy to use the camera and, moreover, it is essential that the photographer be thoroughly familiar with the camera in order to interpret the clicks properly. Even so, a controlled setting to intermediate values is practically out of the question.

Heretofore some cameras have incorporated illuminating devices which irradiate a section of the control scale areas. However, these devices built into the cameras have required additional space, and space is at a premium in complex, modern cameras. Furthermore, such illuminating devices have only been capable of illuminating part of the scale of the controls.

It is one object of the present invention to provide means capable of illuminating as much of the control scale area as may be desired but without taking up any space at all in the camera housing.

In accordance with the invention a lamp, a source of current, and a contact switch are mounted in or on the cable release of a camera. The lamp may thus be moved about within the limits of flexibility of the cable and may be directed to illuminate any desired portion of the control scales or other parts of the camera or even such things as notes and the like. The lamp and battery may be mounted in the pushbutton of the cable release, either on top of the pushbutton or beneath it, or they may be located on the collar of the cable release which cooperates with the pushbutton in operation thereof. Additionally the switch for the illuminating device may be located either on the pushbutton or on the collar.

For example, in order to insure easy accessibility of the illuminating device, it may be located within the actuating member, or the pushbutton and pushrod, of the cable release where the illuminating device will be particularly well protected against external influences and will have great freedom of motion. In such an embodiment the pushbutton and pushrod of the actuating member may consist of two separate parts connected together and comprising one or more recesses or cavities for holding the various components of the illuminating device. The lamp then may be located so that its light shines directly out of the top of the pushbutton or out of the side.

Because of the relatively small dimensions of the pushbutton, the electrical components of the illuminating device may be arranged so that the battery which forms the source of current is located in the pushbutton while the lamp is located beneath it in the pushrod.

As a further alternative the electrical components may be located in the finger collar. In this case the lamp may be placed either parallel to the axis of the cable release, or it may be placed perpendicular thereto if the structural height of the finger collar is to be as low as possible.

Furthermore, the electrical components can be placed in a separate housing which may be attached to the finger collar so that present day cable releases can become equipped with illuminating devices without the necessity of making any extensive structural changes. If the finger collar of the cable release is provided with winglike extensions the battery may be located in one such extension and the lamp and switch in another opposite to the first.

The invention will be described in greater detail in connection with the following drawings in which.

Figure 3:
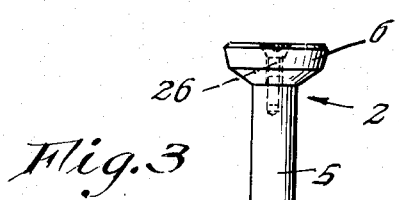
Figure 4:
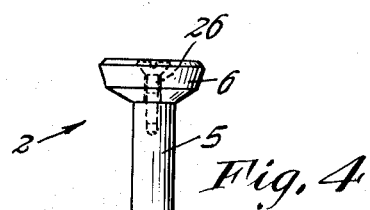
Figure 9:
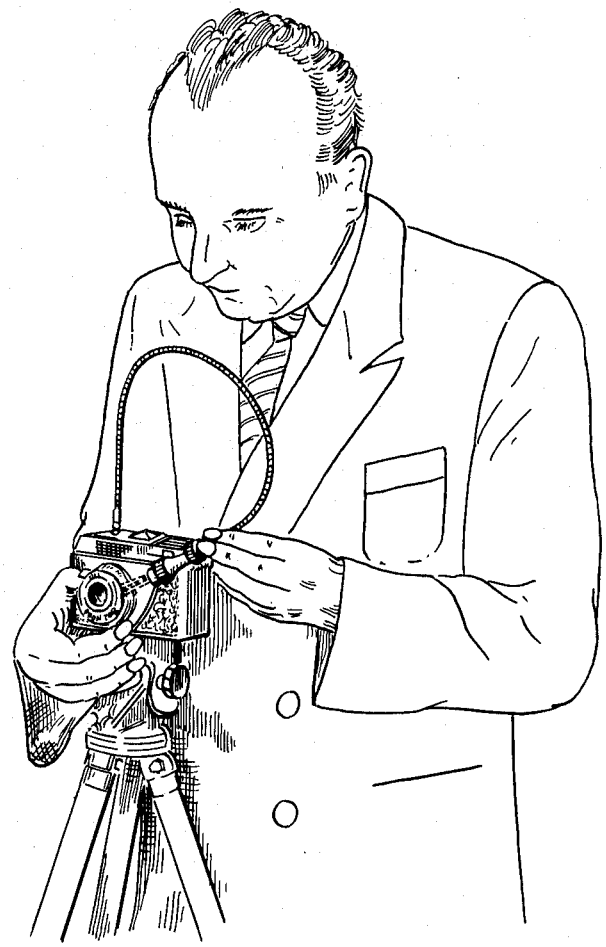

FIGS. 3, 4, and 5 show cross-sectional views of different modifications of the invention with the illuminating device mounted within the collar of the cable release;

FIGS. 6 and 7 show a further modification of the invention in which the illuminating device is mounted in a modified form of collar;

FIGS. 8 shows a modification of the invention in which the illuminating device is attached to the collar of the cable release; and FIG. 9 illustrates the use of the illuminating device of the invention.

Figure 1:
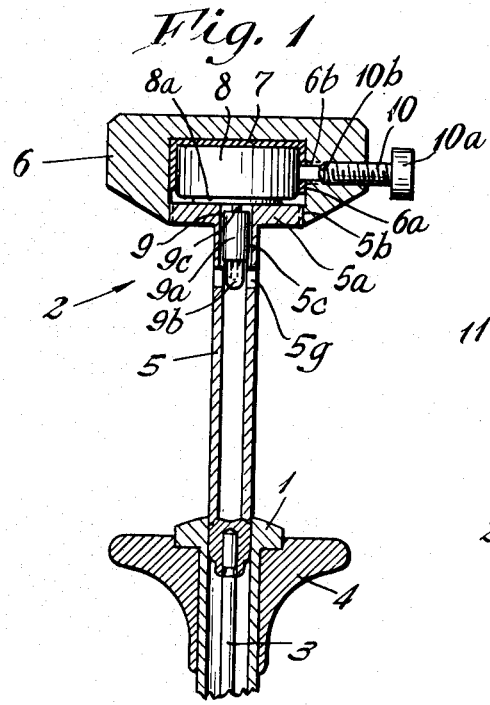
FIG. 1 shows a cross-sectional view of the pushbutton and collar of a cable release for a camera with the illuminating device of this invention located in the pushbutton.

In FIG. 1 only a part of a cable release is shown including a cylindrical tube 1 which receives and guides an actuating member 2. The actuating member is connected to a pin 3 which, in turn, operates the shutter release of the camera (not shown). The guide 1 is affixed within a finger collar 4 that is normally grasped between the index and middle finger when the cable release is being used.

The actuating member 2 includes a rod 5 which slides within the guide 1 and is attached to the pin 3. At the top of the pushrod 5 is a pushbutton 6 which is squeezed, usually by thumb pressure, toward the collar 4 in order to operate the cable release. The pushbutton 6 is joined to the rod 5 by being screwed onto an enlarged head 5a that has a thread 5b at its circumference.

The pushbutton 6 has a cylindrical cavity 6a with an insulating liner 7 in which a small hearing-aid type battery 8 is positioned. The pushrod 5 is hollow, and a lamp 9 having a base 9a, a bulb 9b and a contact 9c is mounted therein directly beneath the battery so that the contact 9c engages one terminal 8a of the battery. A switch to complete the circuit from the battery through the lamp includes a screw 10 located in a threaded bore 6b of the pushbutton 6. The screw 10 is provided with a knob 10a and a contact end 10b. By screwing the screw 10 in against the battery 8 a circuit is completed through the pushbutton 6 and the pushrod 5 to the base 9a. In order for the light to get out, one or more holes 5g are formed in the hollow pushrod 5 adjacent to the filament of the lamp 9.

Figure 2:
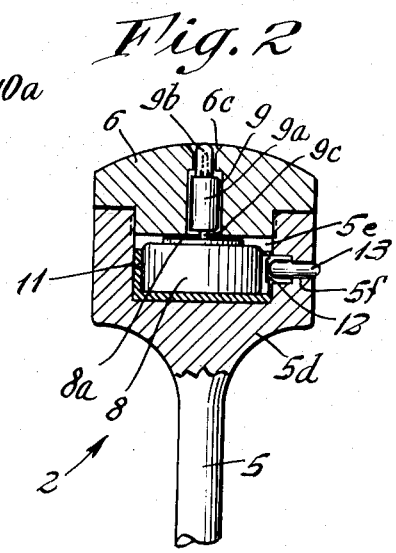
FIG. 2 shows a modification of the structure of FIG. 1 with the lamp located in a different position.

FIG. 2 shows a modified form of the actuating member 2 of the cable release. In this embodiment there is a cylindrical head 5d at the top end of the push-rod 5. A cavity 5e within the cylindrical head holds the battery 8 and a cover, which forms the pushbutton 6, is held in place across the cavity by any convenient means, such as, for example, by threaded engagement with the upper end of the head 5d. The cover 6 has a central bore 6c therethrough to receive the small electric lamp 9 which is held in position so that one terminal 9c of the lamp makes contact with the terminal 8a of the battery. The actuating member 2 may be made of conductive material and in order to prevent the lamp 9 from being illuminated continuously the battery 8 may be imbedded in an insulating casing or jacket 11. A leaf spring 12 may be pressed against the side of the battery 8 by means of a button 13 slideably positioned within a hole 5f extending through the head 5d to complete the circuit to light the lamp.

While the two embodiments shown in FIGS. 1 and 2 illustrate the arrangement of the illuminating device in the pushbutton portion of the cable release FIGS. 3 through 6 show different embodiments in which the lamp is housed in the finger collar of the cable release.

In FIG. 3 the finger collar 4 has a cavity 4a which is laterally spaced from the guide tube 1 and of sufficient size to receive the battery 8 in addition to an insulating liner 40. The lamp 9 is located in a channel through the side of the collar 4 formed by a two-section bore 4b and 4c, the larger part of which serves to hold the base 9a of the lamp and the smaller part of which is of the proper size to receive the bulb 9b itself and to permit the light from the bulb to emmerge. The cavity 4a and the bore 4b are closed by a cover 14 which has a thread 14a so that it may be screwed into matching threads 4d on the upper side of the collar 4. A switch to light the lamp 9 is held within a guide member 15 in the cover 14 and comprises an operating button 16 biased upwardly by a spring 17 and provided with a leaf contact spring 18 which engages one terminal of the battery 8 and the base 9a of the lamp in order to complete the circuit. The button 16 operates by being moved in a direction parallel with the axis of the cable release itself.

Unlike the embodiment shown in FIG. 3 and described hereinabove, the embodiments illustrated in FIGS. 4 and 5 show an annularly shaped battery 8 which serves as the source of current for the lamp 9 and is located in an annular space provided in the finger collar 4 and extending coaxially along the guide tube 1.

In the cable release shown in FIG. 4, the finger collar 4 is formed of two annular members 4e and 4f, the bottom member 4e of which is fixedly mounted on the guide tube 1, while the top member 4f has internal threads which engage a matching threaded section on the guide tube 1 to permit the member 4f to be unscrewed from the guide tube 1 for the purpose of exchanging the battery 8.

The member 4f, which is the upper part of the collar 4, has a cavity 4g which is coaxial with the tubular guide 1 and houses the battery 8. Another cavity 4h is formed in the member 4f to hold the lamp 9, the latter cavity extending parallel to the axis of the cable release and communicating with a radially extending bore 4i to permit light from the lamp 9 to emerge from the opaque collar 4. In this embodiment, the switch for turning on the lamp 9 comprises a button 19 located in a recess 4k of the member 4f and positioned perpendicularly to the axis of the cable release. Associated with this button is a coil spring 20, which bears against a collar 19a. The button 19 thus spring-biased is secured against jumping out of place by a threaded sleeve 21. Pressing the button 19 causes its inner end 19b to connect the case of the battery 8 to the base 9a of the lamp 9, thereby lighting the lamp.

In the cable release illustrated in FIG. 5, the battery 8 is located in a cavity 41 which is coaxial with the tubular guide 1 in the finger collar 4. The cavity 41 is connected to a radially extending channel comprising two sections 4m and 4n which hold the lamp 9 and permit its light to shine out. Both the cavity 41 and the inner part 4m of the channel are closed by means of a cover 22 which is screwed onto the finger collar 4. A guide member 25 is located in this cover to support a pushbutton switch 24 in a position in which it is movable parallel to the axis of the cable release. A spring 23 bears against the under side of the button 24 and biases it away from contact with the base 9a of the lamp. One terminal 9c of the lamp makes contact with terminal 8a of the battery and the remainder of the circuit to light the lamp comprises the finger collar 4, the cover 22, the guide member 25, and the switchbutton 24 which contacts the base 9a when the button 24 is depressed.

It is to be noted in the cable releases illustrated in FIGS. 4 and 5 that the pushbutton 6 of the actuating member 2 must be removed from the pushrod 5 in order to permit the battery 8 to be removed and replaced. In order to facilitate removal of the pushbutton 6 it may be held in place by means of a screw 26 extending into the rod 5, or, alternatively, the upper end of the rod 5 may be threaded and the pushbutton 6 may be correspondingly internally threaded to be attached to the rod 5.

FIGS. 6 and 7 show an embodiment of the cable release in which the finger collar has two wing-like extensions 4p and 4q extending on each side. A space 4r is provided in the extension 4p to hold the battery 8 and this space is closed by means of a cover 39 that can be screwed into the outer end of the cavity 4r. The extension 4q has a cavity 4s which holds the lamp 9 as well as a switch button 27. The latter moves parallel to the axis of the cable release and is biased upwardly by a spring 28. Both the spring 28 and the switch 27 are held within a guide member 29 which is affixed to a cover 30 that closes the top of the cavtiy 4s and may be screwed into the extension 4q.

The electrical connection between the battery 8 and the lamp 9 includes a pair of wire leads 31 and 32. Lead 31 is connected to terminal 8a of the battery and to the contact 9c of the lamp 9 while lead 32 is connected to the case of the battery and to the guide member 29 which is made of conductive material.

The members of the cable release which hold the illuminating device may be made either of metal or of plastic. If they are metal, the receiving spaces for the battery must be lined with insulating material as shown in FIGS. 1 through 3 but if plastic is used which is an insulating material the additional insulating material used for lining the battery space may be omitted.

FIG. 8 shows another embodiment of the illuminating device in which a special housing 33 is provided for the illuminating device. This housing has a threaded pin 34 which can be screwed into a correspondingly threaded hole 4t in the finger collar 4. The housing 33 is preferably cylindrical in shape and is divided into two halves with interior spaces making up a cavity 33a in which the battery 8 is located and a cavity 33b in which the lamp 9 is held. In addition a cavity 33c is provided in which a guide member 35 is located and that contains a switch 36 biased by means of a spring 35a. A channel 33d is located at the end of the cavity 33b as a passageway for light from the bulb 9. The electrical connection between the battery 8 and the lamp 9 includes a wire 37 connecting the terminal 8a of the battery to the terminal 9c of the lamp and a wire 38 connecting the base 9a of the lamp to the conductive guide member 35. Pressing the switch button 36 completes the circuit to the shell of the battery 8.

FIG. 9 shows a camera and cable release incorporating an illuminating device in accordance with the present invention. As may be seen the illuminating device, being located at the end of the flexible cable release, may be placed so as to shine upon any part of the camera, not only the exposure setting controls adjacent to the lens but also the film counter and other parts of the camera. The light is sufficient for the illumination of a very limited area and is not so brilliant as to interfere with the general illumination of the scene to be photographed.

What is claimed is:

1. A cable release for photographic cameras comprising a finger collar; an actuating device comprising a pushrod and a pushbutton threadedly attached thereto, said actuating device being displaceably mounted with respect to said finger collar; a battery mounted within said pushbutton; a lamp mounted within said actuating device; a contact switch mounted on said pushbutton; and conductive means connecting said battery, said lamp, and said contact switch all within said actuating device.

2. A cable release for photographic cameras comprising a finger collar; an actuating device comprising a pushrod and a pushbutton threadedly attached thereto, said actuating device being displaceably mounted with respect to said finger collar; a battery mounted within said pushbutton; a lamp mounted within said pushbutton, said pushbutton having an interior wall defining means for holding said lamp and a channel through the side of said pushbutton; a contact switch mounted on said pushbutton; and conductive means connecting said battery, said lamp, and said contact switch all within said actuating device.

3. A cable release for photographic cameras comprising a finger collar; an actuating device comprising a hollow pushrod and a pushbutton threadedly attached thereto, said actuating device being displaceably mounted with respect to said finger collar; a battery mounted within said pushbutton; a lamp mounted within said pushrod; a contact switch mounted on said pushbutton; and conductive means connecting said battery, said lamp, and said contact switch all within said actuating device.

4. A cable release for photographic cameras comprising a finger collar; an actuating device comprising a pushrod and a pushbutton attached thereto, said actuating device being displaceably mounted with respect to said finger collar; a battery mounted in said collar; a lamp mounted in said collar; a contact switch mounted in said collar; and conductive means connecting said battery, said lamp, and said contact switch all within said collar.

5. A cable release for photographic cameras comprising an actuating means displaceably mounted with respect to a finger collar and comprising a pushrod and a pushbutton attached thereto; a finger collar having an interior wall defiining an annular cavity; a battery mounted in said annular cavity; a lamp held within said collar; a contact switch on said collar; conductive means connecting said battery, said lamp, and said contact switch all within said collar; and a cover closing said annular cavity to enclose said battery.

6. A cable release for photographic cameras comprising a finger collar; an actuating device comprising a pushrod and a pushbutton attached thereto, said actuating device being displaceably mounted with respect to said finger collar; guide means within said collar to guide said said pushrod; an interior wall in said collar defining an annular cavity concentric with said guide means; a battery mounted in said cavity; a lamp mounted in said collar parallel to the axis of said pushrod; a contact switch mounted in said collar; and conductive means connecting said battery, said lamp, and said contact switch all within said collar.

7. A cable release for photographic cameras comprising a finger collar; an actuating device comprising a pushrod and a pushbutton attached thereto, said actuating device being displaceably mounted with respect to said finger collar; guide means within said collar to guide said pushrod; an interior wall in said collar defining an annular cavity concentric with said guide means; a battery mounted in said cavity; a lamp mounted in said collar perpendicular to the axis of said pushrod; a contact switch mounted in said collar; and conductive means connecting said battery, said lamp, and said contact switch all within said collar.

8. A cable release for photographic cameras comprising a pushbutton; a finger collar; a pair of wing-like extensions on said collar; a battery mounted within one of said extensions; a lamp mounted within the other of said extensions; a contact switch mounted on said other extension; and conductive means connecting said battery, said lamp, and said contact switch.

9. In combination with a cable release for a photograph camera, illumination means for illuminating any desired portion of the control scale area of a camera comprising a housing means structurally associated with the cable release, a battery within said housing means, a lamp within said housing means, a contact switch within said housing means and manually operable externally of said housing means and conductive means connecting said battery, said lamp, and said contact switch all within said housing means, said housing means having means permitting the light from said lamp to be externally visible from said housing means.

References Cited by the Examiner
UNITED STATES PATENTS

| 1,588,666 | 6/1926 | Donchian | 95—31 |
| 2,273,360 | 2/1942 | Kidder | 95—1.1 |
| 2,820,885 | 1/1958 | Neugass | 240—8.16 |

JOHN M. HORAN, *Primary Examiner.*

NORTON ANSHER, *Examiner.*